United States Patent [19]
Shibahara

[11] Patent Number: 5,259,031
[45] Date of Patent: Nov. 2, 1993

[54] SHEETS FOR CONCEALING INFORMATION RECORDED ON RECORDING PAPER FOR USE WITH A FACSIMILE AND METHOD OF CONCEALING INFORMATION RECORDING PAPER BY THE USE OF THE CONCEALMENT SHEET

[75] Inventor: Kenji Shibahara, Osaka, Japan

[73] Assignee: Kabushiki Kaisha Challenge Five, Osaka, Japan

[21] Appl. No.: 788,363

[22] Filed: Nov. 6, 1991

[30] Foreign Application Priority Data

Nov. 28, 1990 [JP] Japan .................. 2-333212

[51] Int. Cl.⁵ .................. H04N 1/44; B42D 15/00
[52] U.S. Cl. .................. 380/18; 283/101; 283/901
[58] Field of Search .............. 380/18; 283/901, 17, 283/73, 101

[56] References Cited

U.S. PATENT DOCUMENTS 5,001,749  3/1991  Iggulden et al. .............. 380/18
5,085,469  2/1992  Castro .............. 283/101 X

FOREIGN PATENT DOCUMENTS 61-105175  5/1986  Japan .
61-145965  7/1986  Japan .
1-036490   2/1989  Japan .................. 283/101
1-248875  10/1989  Japan .

Primary Examiner—Gilberto Barron, Jr.

[57] ABSTRACT

In concealment sheets for information recording paper, adhered to the same, such as facsimile recording paper or the like, for the purpose of concealing information displayed on the information recording paper, a transparent protective layer for protecting the information displayed on the information recording paper is provided on at least one surface of a sheet base, and the protective layer is peeled away from the sheet base and then can be moved to the side of the information recording paper after it is adhered to the information recording paper. With the above construction, deterioration of the information, such as the deterioration of the characters displayed on the facsimile recording paper or the like, can be prevented. The paper can be prevented from curling by stiffening the facsimile recording paper. What is more, falsification of displayed information can be prevented.

2 Claims, 4 Drawing Sheets

FIG. 5(a)
FIG. 5(b)
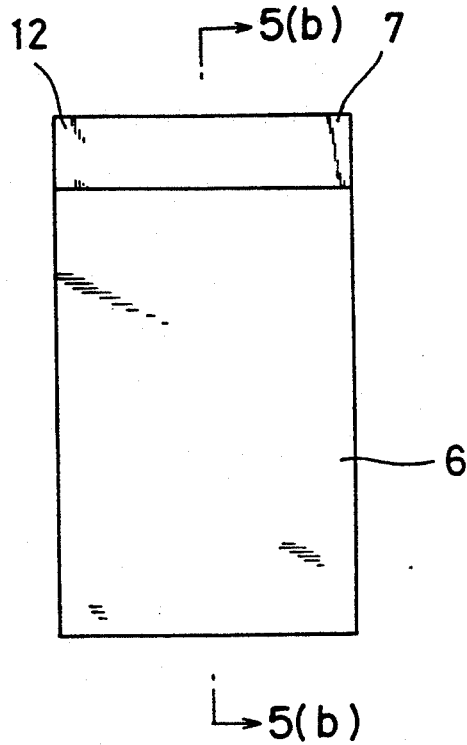
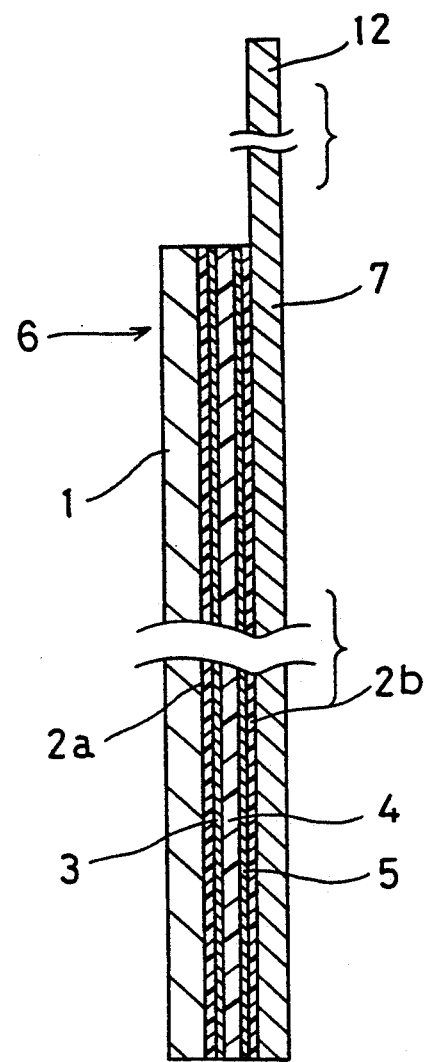

SHEETS FOR CONCEALING INFORMATION RECORDED ON RECORDING PAPER FOR USE WITH A FACSIMILE AND METHOD OF CONCEALING INFORMATION RECORDING PAPER BY THE USE OF THE CONCEALMENT SHEET

BACKGROUND OF THE INVENTION

1. Field of the Invention

The present invention relates to sheets for concealing information recorded on recording paper for use with a facsimile receiver and to a method of concealing information recorded on the paper by the use of the concealment sheet.

More particularly, the present invention relates to sheets for concealing information recording paper, which sheets are adhered to the information recording paper, and to a concealment method using the concealment sheets for the purpose of maintaining correspondence in a state in which information, such as confidential correspondence displayed on the information recording paper or the like, is concealed.

2. Description of the Related Art

In the prior art, there are such kinds of concealment sheets for facsimile recording paper, as disclosed, for example, in Japanese Patent Laid-Open Nos. 61-105175, 61-145965, 1-248875, and the like.

These concealment sheets are all designed to conceal information displayed on the facsimile recording paper by being adhered thereto. During transmission and the time immediately thereafter, the concealment sheets are adhered to the facsimile recording paper as cover sheets. The concealment sheets are peeled off by the person who should receive the information after transmission, and the information may be read.

However, generally, the surface of facsimile recording paper has been specially treated for transferring characters thereon. But, such characters are liable to deteriorate. Thus, there is a danger that the characters may get fainter or be erased when the paper is stored for a long period of time. Such facsimile recording paper is generally thin and liable to curl, thereby making it more inconvenient to store.

Although the facsimile recording paper is covered by the concealment sheet while they are adhered together, after the concealment sheet is peeled away by the recipient, there is a danger that the information displayed on the surface will be falsified because the surface of the facsimile recording paper is exposed.

SUMMARY OF THE INVENTION

The present invention has been devised to solve the above-mentioned problems of the prior art. Accordingly, objects of the present invention are: to prevent the deterioration of the information, such as characters displayed on the facsimile recording paper or the like; to prevent the paper from curling by causing stiffness in the facsimile recording paper; and to prevent the falsification of displayed information.

The present invention has devised sheets for concealing information recorded on recording paper for use with a facsimile receiver and a method of concealing such information by the use of the concealment sheet. The concealment sheets are adhered to the information recording paper, such as facsimile recording paper or the like, to conceal information recording paper for the purpose of concealing information displayed on the paper. A transparent protective layer for protecting information displayed on the paper is provided on at least one side of a sheet base. After it is adhered to the information recording paper, it can be peeled away from the sheet base and moved to the side of the information recording paper.

The concealment method is characterized in that information displayed on the information recording paper is concealed by adhering a concealment sheet with the protective layer for protecting the information displayed on the information recording paper, such as the facsimile recording paper or the like being provided on at least one of the sides of the sheet base in such a manner as to be capable of being peeled away, onto the information recording paper in a state in which the protective layer is made to face the information recording paper.

In accordance with the construction as set forth, a concealment sheet is adhered to the information recording paper by means of a protective layer with the surface, on which the protective layer is pasted, being directed toward the information recording paper. With the concealment paper being adhered as described above, the information displayed on the information recording paper is concealed.

Next, a person who receives the information peels away the above-described concealment paper from the information recording paper. Since the protective layer is provided on a sheet base in such a way that the protective layer is peeled away from the sheet base and moved to the side of the information recording paper, when the concealment sheet is peeled away from the information recording paper, the protective layer is peeled away from the sheet base and adhered to that side of the information recording paper on which the information is displayed.

Therefore, the information displayed on the information recording paper will be protected by the protective layer as a result of such a protective layer being adhered thereto. And characters will neither change in color nor grow dull, thus, deterioration of the information is prevented. It becomes possible to store the paper for a long period of time irrespective of the type of the information recording paper. The effect of storage after the information is read by the recipient is improved considerably over a conventional paper.

Also, the information recording paper is stiffened because a protective layer is adhered to the information recording paper, thereby improving the effect of storing paper. What is more, as the result of the stiffness, the information recording paper does not curl as in the prior art. In addition, since the protective layer is adhered to the information recording paper and remains on the paper, falsification of displayed characters or the like is prevented.

When the protective layer is moved to the side of the information recording paper from the sheet base, it becomes difficult for the protective layer to be adhered again to the side of the sheet base. Thus, an improper use of the concealment sheet is prevented.

Because the protective layer can be seen through, even if it is adhered to the information recording paper, the information displayed on the information recording paper can be seen through the protective layer. A person receiving the information will have no difficulty reading it.

The information recording paper becomes glossy because the protective layer is adhered thereto. Thus, the exterior and appearance of paper on which the information is displayed becomes excellent. In addition, it is practical when transmission of color documents or the like is made possible in the future.

These and other objects, features and advantages of the present invention will become clear when reference is made to the following description of the preferred embodiments of the present invention, together with reference to the accompanying drawings.

BRIEF DESCRIPTION OF THE DRAWINGS

FIG. 5(a) is a front view showing a state in which the facsimile recording paper is cut to have a fixed dimension;

FIG. 5(b) is an enlarged sectional view taken along the line 5(b)—5(b) with an intermediate section of the concealment sheet being omitted;

DESCRIPTION OF THE PREFERRED EMBODIMENTS

An embodiment of sheets for concealing information recorded on recording paper for use with a facsimile receiver according to the present invention will be explained below with reference to the accompanying drawings.

Figure 1:
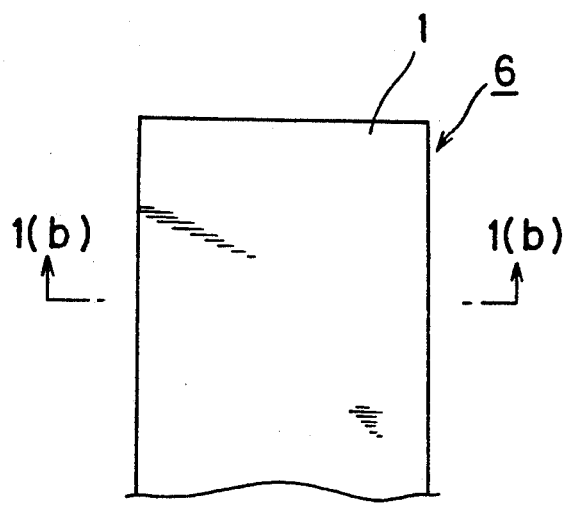
FIG. 1(a) is a top plan view showing a concealment sheet according to an embodiment of the present invention.
FIG. 1(b) is an enlarged sectional view taken along the line 1(b)—1(b) of FIG. 1(a) with an intermediate section of the concealment sheet being omitted.
Figure 1:
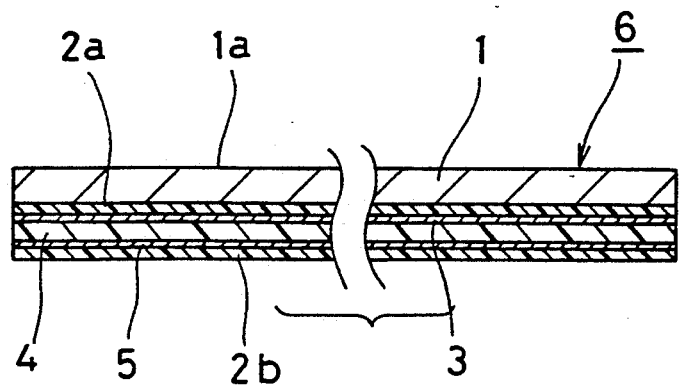

In FIGS. 1(a) and 1(b), a lengthy sheet base 1 is made of paper, in which the side of a surface 1a thereof is colored. A synthetic resin layer 2a is made of an ethylene vinyl acetate copolymer resin, in which the layer is provided on another surface of the sheet base 1. Provided on a surface of the synthetic resin layer 2a via a weak bonding agent 3 formed of two liquid hardening type bonding agents is a oriented polypropylene film 4 [Product name: Pylen Film-ET (Toyobo Co., Ltd.)] which can be broken in one direction. A synthetic resin layer 2b is formed of an ethylene vinyl acetate copolymer resin similar to the synthetic resin layer 2a and provided on a surface opposite to the surface on which the synthetic resin layer 2a of the film 4 is adhered via a strong bonding agent 5 formed of two liquid hardening type bonding agents. Thus, the weak bonding agent 3 peels away from the film 4.

Next, an explanation will be given on the method of concealing a facsimile recording paper 7 by use of a concealment sheet 6 constructed as described above.

Figure 2:
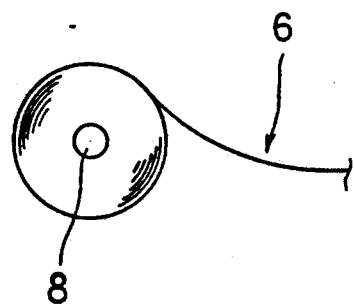
FIG. 2 is a schematic side view showing a state in which the concealment sheet is wound around a roll.
Figure 3:
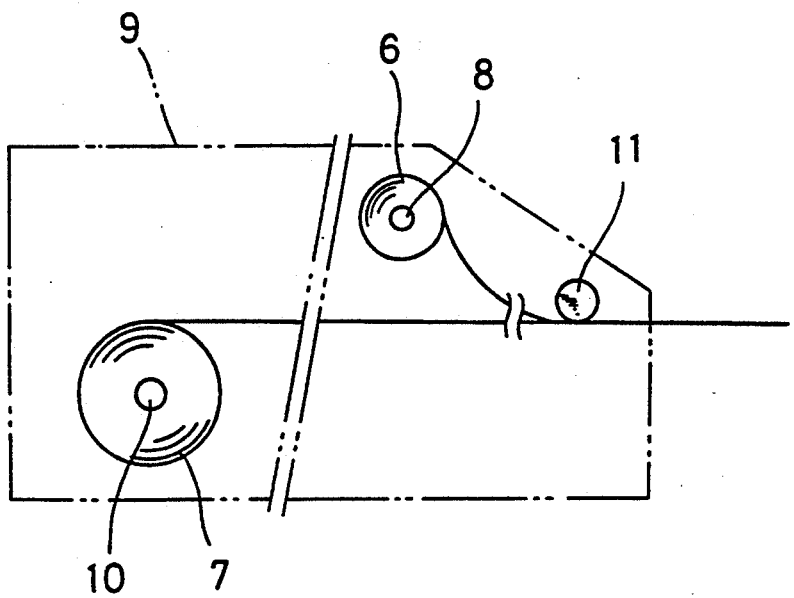
FIG. 3 is a schematic side view showing a state in which each section is placed inside a facsimile receiver.
Figure 4:
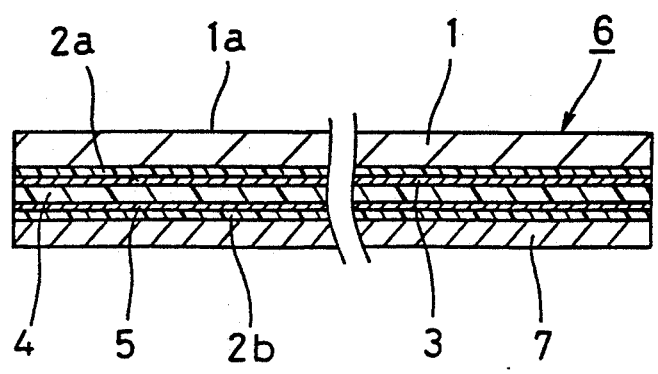
FIG. 4 is an enlarged sectional view, with an intermediate section of the concealment sheet being omitted, showing a state in which the concealment sheet is adhered to facsimile recording paper.

As shown in FIG. 2, first the concealment sheet 6 is wound around a roll 8. This roll 8 is then placed inside a facsimile receiver 9 together with the facsimile recording paper 7, as shown in FIG. 3.

In this case, a roll 10 around which the facsimile recording paper 7 is wound operates at any time. However, the roll 8 around which the concealment sheet 6 is wound operates only when a party at the transmitting side desires security protection. A heating roller 11 for heating and bonding the facsimile recording paper 7 and the concealment sheet 6 to each other is disposed in front of the two rolls 8 and 10.

When a transmitting party transmits information to a specific recipient at the receiving end with a view of obtaining security protection, and if an original document is transmitted by using, for example, code numbers or the like, the facsimile receiver 9 at the receiving side operates. The two rolls 8 and 10 then operate, and both the facsimile recording paper 7 and the concealment sheet 6 are fed. Then, information and the name of the recipient are transferred to the facsimile recording paper 7.

Thereafter, the facsimile recording paper 7 and the concealment sheet 6 are thermally bonded together while they are being heated and pressed by the heating roller 11. The facsimile recording paper 7 and the concealment sheet 6 are disconnected at different timings at which electrical signals are transferred before they are adhered together by the heating roller 11.

Accordingly when the facsimile recording paper 7 and the concealment sheet 6 are ejected from the facsimile receiver 9, they are each formed to have a preset dimension. As shown in FIGS. 5(a) and 5(b) the concealment sheet 6 is set so as to be smaller than the facsimile recording paper 7. A portion of the facsimile recording paper 7, which extends from the concealment sheet 6, is formed as a recipient writing column 12, and the name of the recipient is written in the recipient writing column 12.

As described above, because the facsimile recording paper 7 is bonded on the surface of the concealment sheet 6 ejected from the facsimile receiver 9 in the above manner, the information transferred to that surface is concealed by the concealment sheet 6.

In particular, since the surface 1a of the sheet base 1 of the concealment sheet 6 is colored as described above, the above information is not only concealed in a simple way, but also substantially completely prevented from being seen from outside.

As a consequence, at the receiving end, the information is not read by any party except a person receiving the information and security is thus ensured until the facsimile recording paper 7 is passed to the person whose name is written in the recipient writing column 12.

Figure 6:
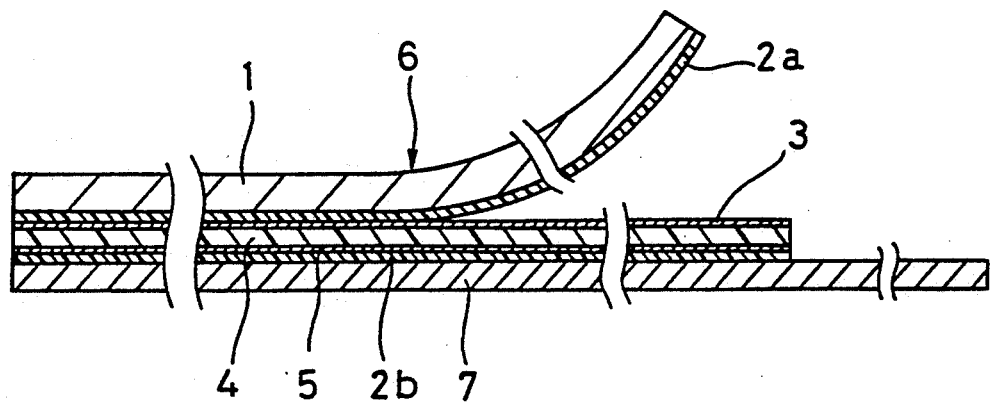
FIG. 6 is an enlarged sectional view, with an intermediate section of the concealment sheet being omitted, showing a state in which the concealment sheet is peeled away.

Next, after the facsimile recording paper 7 is passed to the recipient, as shown in FIG. 6, the information displayed on the facsimile recording paper 7 is read by the recipient peeling off the sheet base 1.

Because of the arrangement in which the film 4 is provided on the back surface of the sheet base 1 via the synthetic resin layer 2a and the weak bonding agent 3 and the synthetic resin layer 2b is provided on the back surface of the film 4 via the strong bonding agent 5, an interlayer separation between the film 4 and the weak bonding agent 3 occurs due to the difference between the strength of the bonding force of the bonding agent 3 for layer 2a and that of bonding agent 5 for layer 2b if the sheet base 1 is peeled, as described above. The film 4 is adhered to the facsimile recording paper 7 and reliably moved to the side of the facsimile recording paper 7. Furthermore, since the film 4 is transparent, the information displayed on the facsimile recording paper 7 can be seen through the film 4.

What is more, as a result of the film 4 being adhered to the facsimile recording paper 7, the facsimile recording paper 7 is stiffened. Also, the displayed information is protected by the film 4 and can withstand being stored for a long period of time. Although in the above-described embodiment, the sheet base 1 is made of paper, it may be made of materials other than paper.

In the above-described embodiment, because a oriented polypropylene film which can be broken in one direction is used for the film 4, the facsimile recording paper 7 can be broken together with the film 4 after the film 4 is moved to the facsimile recording paper 7 and adhered thereto. Therefore, the facsimile recording paper 7 can be speedily disposed of after the recipient reads the information. Thus, this embodiment has a notable advantage in that the secrecy concerning a confidential and personal communication can be maintained. However, although in the above embodiment the film 4 is made of the above material, any desired material may be used. In addition, the film 4 may be made of transparent or semi-transparent material as in the above-described embodiment. In short, it is only necessary that the information be seen from outside.

Although in the above-described embodiment a film made of synthetic resin is used for a protective layer for protecting the information displayed on the facsimile recording paper 7, a film made of another material, such as a synthetic resin layer formed of the above-described ethylene vinyl acetate copolymer resin, can be used. In short, it is only necessary that materials which are capable of protecting the information displayed on information recording paper and by which the information can be seen from outside be used.

In the above-described embodiment, since the synthetic resin layer 2a formed of an ethylene vinyl acetate copolymer resin is provided between the sheet base 1 and the film 4, a notable advantage in that an excellent bonding force by which the film 4 is bonded to the side of the paper-made sheet base 1 can be obtained. However, the provision of such a synthetic resin layer 2a is not an indispensable condition for the present invention.

In the above-described embodiment, because the weak bonding agent 3 and the strong bonding agent 5 are respectively provided between the synthetic resin layer 2a and the film 4 and between the synthetic resin layer 2b and the film 4, the sheet base 1 is caused to peel away from the film 4, and the film 4 is moved to the side of the facsimile recording paper 7 and adhered thereto. The provision of such a weak bonding agent 3 and a strong bonding agent 5 is not an indispensable condition. In short, it is only necessary that the concealment sheet 6 be formed in such a way that, after the concealment sheet 6 is adhered to the side of the facsimile recording paper 7, the sheet base 1 is peeled away from the facsimile recording paper 7, the sheet base 1 is peeled away from the facsimile recording paper 7 and the protective layer, such as the film 4 or the like, is moved to the side of the facsimile recording paper 7 and adhered thereto.

Although in the above-described embodiment a surface of the sheet base 1 is colored as a means for preventing information transfereed to the facsimile recording paper 7 from being seen, the see-through preventing means is not limited to this coloring. In the embodiment, the see-through preventing means is provided only on the side of the sheet base 1. Such a see-through preventing means can also be disposed on the back surface of the facsimile recording paper 7. In this case, there is an advantage in that seeing through from both the obverse and reverse surfaces of the paper can be prevented in a state in which the concealment sheet is adhered to the facsimile recording paper 7. However, the provision of such a see-through preventing means is not a necessary condition for the present invention.

Figure 7:
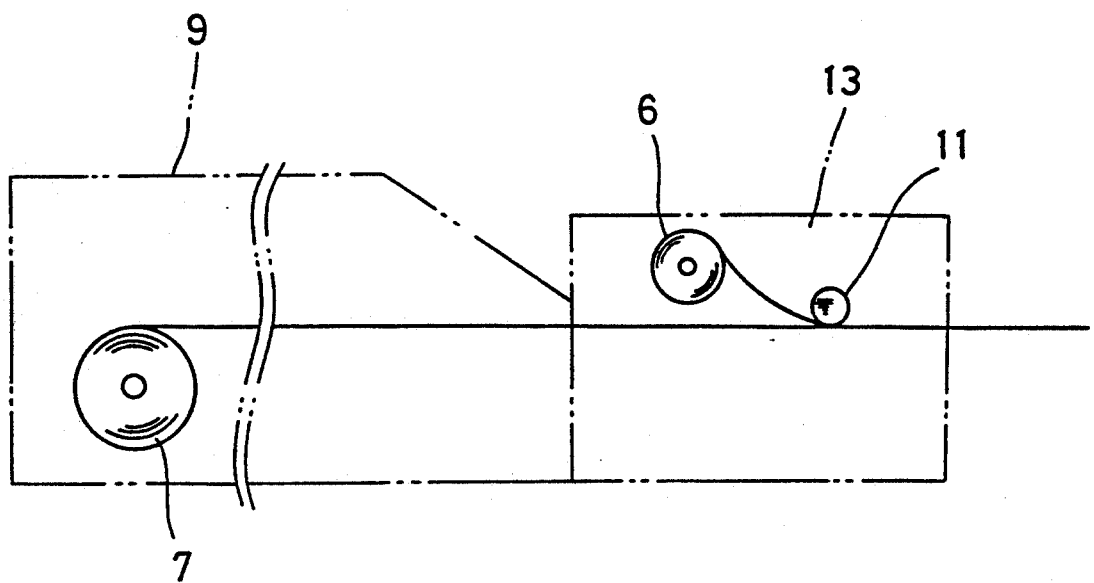
FIG. 7 is a schematic side view showing a state in which the concealment sheet is placed according to another embodiment.

Although in the above-described embodiment the concealment sheet 6 as well as the facsimile recording paper 7 is wound around the roll 8 in the receiver 9, the present invention is not limited to such a case. For example, as shown in FIG. 7, in addition to the facsimile receiver 9, an adhering apparatus 13 for adhering the concealment sheet 6 to the facsimile recording paper 7 is disposed in back of the facsimile receiver 9, and the concealment sheet 6 may be adhered to the facsimile recording paper 7 inside the adhering apparatus 13. In this case, it is possible that a commonly used facsimile receiver 9 may be used as it is and the adhering apparatus 13 may be disposed successively thereto.

In any case, a means for mounting the concealment sheet 6 and a place where the sheet 6 is placed are not limited to those in the above-described embodiment. They can be modified freely within the scope and spirit of the present invention. Also, a means for cutting the facsimile recording paper 7 and the concealment sheet 6 to different dimensions is not limited to a means of causing the timings at which the facsimile recording paper 7 and the concealment sheet 6 are transported to deviate by electrical signals or the like as in the above-described embodiment.

Furthermore, a means for specifying the name of a recipient at the receiving end is not limited to a means for forming the recipient writing column 12 by changing the dimensions of both sheets as in the above-described embodiment. For example, a means for transferring the name of the recipient to the surface of the concealment sheet 6 may be used.

Although in the above-described embodiment, the film 4 is adhered to only one of the sides of the facsimile recording paper 7, the film 4 may be adhered to both surfaces of the facsimile recording paper 7, for example, when information is displayed on both surfaces of the facsimile recording paper 7.

The facsimile recording paper 7 is not limited to a lengthy paper as in the above-described embodiment, but a regular size paper may be used. Such a regular size paper obviates the paper cutting operation.

Although, in the above-described embodiment, a case in which the facsimile recording paper 7 is concealed is explained, the present invention can also be applied to conceal, for example, documents printed by a computer.

Many different embodiments of the present invention may be constructed without departing from the spirit and scope of the present invention. It should be understood that the present invention is not limited to the specific embodiments described in this specification, and is only limited in the appended claims.

What is claimed is:

1. A concealment sheet for use in concealing information displayed on facsimile information recording paper comprising a sheet base having a flat surface and providing concealment, a first synthetic resin layer located on said flat surface, a weak bonding agent layer located on said first synthetic resin layer, a transparent synthetic resin film layer, for protecting the information displayed, located on said weak bonding agent, a strong bonding agent layer located on said transparent synthetic resin film layer, a second synthetic resin layer located on said strong bonding agent layer, and said second synthetic resin layer being adapted to be adhered to facsimile information recording paper, whereby, after the concealment sheet has been heated and bonded onto the information recording paper, the concealment provided by the sheet base can be pulled away from the weak bonding agent and the sheet base separated from the facsimile information recording paper.

2. A concealment sheet according to claim 1, wherein said transparent synthetic resin film layer is made of a film which can be broken.

* * * * *